US011642988B2

(12) United States Patent
Susko (10) Patent No.: US 11,642,988 B2
(45) Date of Patent: May 9, 2023

(54) LOCK ASSEMBLY FOR A VEHICLE SEAT (71) Applicant: FORD GLOBAL TECHNOLOGIES, LLC, Dearborn, MI (US)

(72) Inventor: Thomas J. Susko, Saint Clair Shores, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 226 days.

(21) Appl. No.: 17/335,128

(22) Filed: Jun. 1, 2021

(65) Prior Publication Data
US 2022/0379775 A1 Dec. 1, 2022

(51) Int. Cl.
*B60N 2/08* (2006.01)
*B60N 2/07* (2006.01)
*B60N 2/42* (2006.01)

(52) U.S. Cl.
CPC ......... *B60N 2/0881* (2013.01); *B60N 2/0715* (2013.01); *B60N 2/085* (2013.01); *B60N 2/0825* (2013.01); *B60N 2/43* (2013.01)

(58) Field of Classification Search
None
See application file for complete search history.

(56) References Cited

U.S. PATENT DOCUMENTS

| | | | | |
|---|---|---|---|---|
| 5,366,268 A | * | 11/1994 | Miller | B60N 2/4228 297/216.13 |
| 5,374,105 A | * | 12/1994 | Kracht | B60N 2/4279 297/423.31 |
| 5,813,726 A | * | 9/1998 | Husted | B60N 2/42781 296/68.1 |
| 5,826,936 A | | 10/1998 | Scordato et al. | |
| 6,637,712 B1 | | 10/2003 | Lagerweij | |
| 6,666,508 B1 | | 12/2003 | Hofmann et al. | |
| 7,607,729 B1 | * | 10/2009 | Udriste | B60N 2/062 297/216.1 |
| 7,748,778 B1 | * | 7/2010 | Udriste | B60N 2/062 297/378.11 |
| 8,573,698 B2 | * | 11/2013 | Wojatzki | B60N 2/0818 248/420 |
| 9,393,881 B2 | | 7/2016 | Joern et al. | |
| 10,843,594 B2 | | 11/2020 | Escobedo et al. | |
| 2009/0114793 A1 | * | 5/2009 | Brewer | B60N 2/0705 384/34 |
| 2015/0090855 A1 | | 4/2015 | Arakawa et al. | |

FOREIGN PATENT DOCUMENTS

DE 202005013714 U1 12/2005

* cited by examiner

*Primary Examiner* — David E Allred
(74) *Attorney, Agent, or Firm* — Vichit Chea; Price Heneveld LLP (57) ABSTRACT

A lock assembly for a vehicle seat includes a lever that has a body and a retention tab that extends from the body, a biasing member that is operably coupled to the body of the lever, an engagement member that is proximate to the lever, and an inertia member that has a weighted head and a retention hook. The inertia member is operable between a first position and a second position.

13 Claims, 9 Drawing Sheets

LOCK ASSEMBLY FOR A VEHICLE SEAT

FIELD OF THE DISCLOSURE

The present disclosure generally relates to a vehicle seat. More specifically, the present disclosure relates to a lock assembly for a vehicle seat.

BACKGROUND OF THE DISCLOSURE

Vehicles typically include seats on which occupants can be supported. The seats can include adjustment features to assist the occupant in adjusting the position of the seat within the vehicle. Mechanical seat adjustment features may be inadvertently contacted.

SUMMARY OF THE DISCLOSURE

According to a first aspect of the present disclosure, a seating assembly for a vehicle includes a track assembly that is configured to be coupled to a floor of said vehicle. A seat base is operably coupled to the track assembly. The seat base includes first and second crossbars and a towel bar that is operably coupled to the first crossbar. A lock assembly is operably coupled to the second crossbar of the seat base and is selectively coupled to the track assembly. The lock assembly include a lever that is operably coupled to the first and second crossbars and is proximate to the track assembly. The lever has a retention tab. The lock assembly further includes a biasing member that is operably coupled to the lever that is proximate to the second crossbar, and an inertia member that is operably coupled to the second crossbar. The inertia member has a weighted head and a retention hook.

Embodiments of the first aspect of the disclosure can include any one or a combination of the following features:
  the inertia member is selectively operable between a first position and a second position;
  the track assembly includes a plunger that is operable between a depressed position and an extended position;
  the seat base is configured to translate along the track assembly when the plunger is in the depressed position;
  the second position of the inertia member corresponds with the extended position of the plunger;
  the biasing member is operably coupled to the inertia member and is configured to retain the inertia member in the first position until a predetermined force is applied;
  the retention hook of the inertia member is operably coupled to the retention tab of the lever in the second position of the inertia member; and/or
  the weighted head of the inertia member is configured to rotate the inertia member upon application of a predetermined force.

According to a second aspect of the present disclosure, a lock assembly for a vehicle seat includes a lever that has a body and a retention tab that extends from the body, a biasing member that is operably coupled to the body of the lever, an engagement member that is proximate to the lever, and an inertia member that has a weighted head and a retention hook. The inertia member is operable between a first position and a second position.

Embodiments of the second aspect of the disclosure can include any one or a combination of the following features:
  the biasing member is coupled to the inertia member;
  the biasing member is configured to maintain the inertia member in the first position;
  the inertia member is in the second position when a predetermined force is applied to the inertia member;
  the weighted head has a weight greater than a tensile force of the biasing member;
  the weighted head is configured to rotate the inertia member from the first position to the second position;
  the retention hook is operably and selectively coupled to the retention tab in the second position of the inertia member;
  the weighted head is selectively and operably coupled to the engagement member in the first position of the inertia member; and/or
  the engagement member is a bumper that is configured to absorb the engagement with the weighted head of the inertia member when the inertia member rotates from the second position to the first position.

According to a third aspect of the present disclosure, a seating assembly includes a track assembly that has a first rail and a second rail. An adjustment assembly is operably coupled to the track assembly. The adjustment assembly includes first and second crossbars and a towel bar that is operably coupled to the first crossbar and is configured to translate between a raised position and a lowered position. A lock assembly is operably coupled to the adjustment assembly. The lock assembly includes a lever that is operably coupled to the first and second crossbars. The lever has a body and a retention tab that extends from the body. The lock assembly further includes an inertia member that has a weighted head and a retention hook. The inertia member is configured to translate between a first position and a second position.

Embodiments of the third aspect of the disclosure can include any one or a combination of the following features:
  the retention hook is selectively coupled to the retention tab of the lever in the second position of the inertia member;
  the inertia member is configured to translate from the first position to the second position upon application of a predetermined force;
  each of the first and second rails of the track assembly further include a plunger that is operably coupled to the lever and is configured to translate between an extended position and a depressed position;
  the retention hook of the inertia member is operably coupled to the retention tab of the lever in the second position and is configured to maintain separation between the plunger and the lever; and/or
  a biasing member that is operably coupled to the inertia member and is configured to selectively maintain the inertia member in the first position.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Additional features and advantages of the presently disclosed device will be set forth in the detailed description which follows and will be apparent to those skilled in the art from the description, or recognized by practicing the device as described in the following description, together with the claims and appended drawings.

Figure 1:
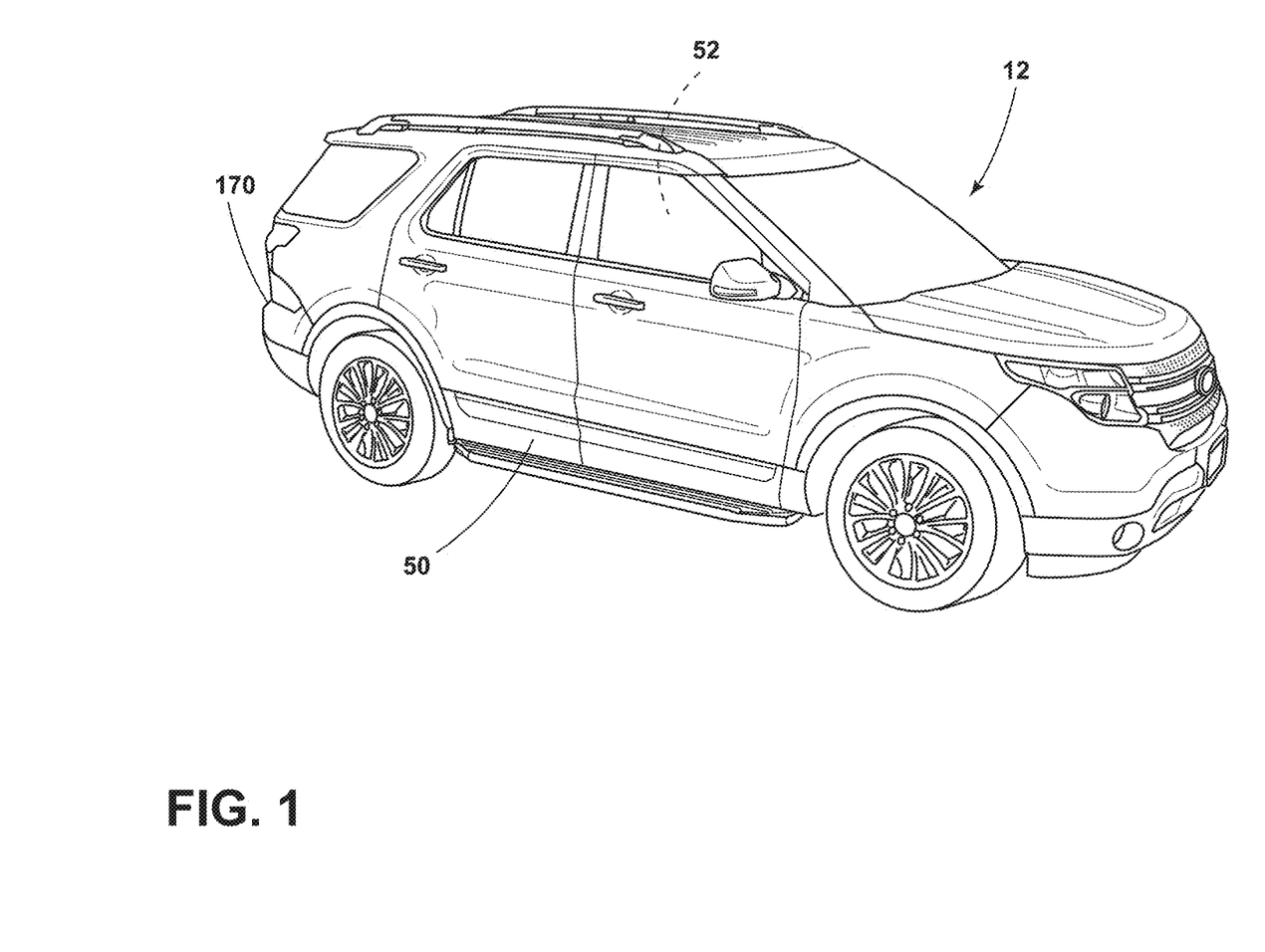
FIG. 1 is a top perspective view of a vehicle of the present disclosure.
Figure 2:
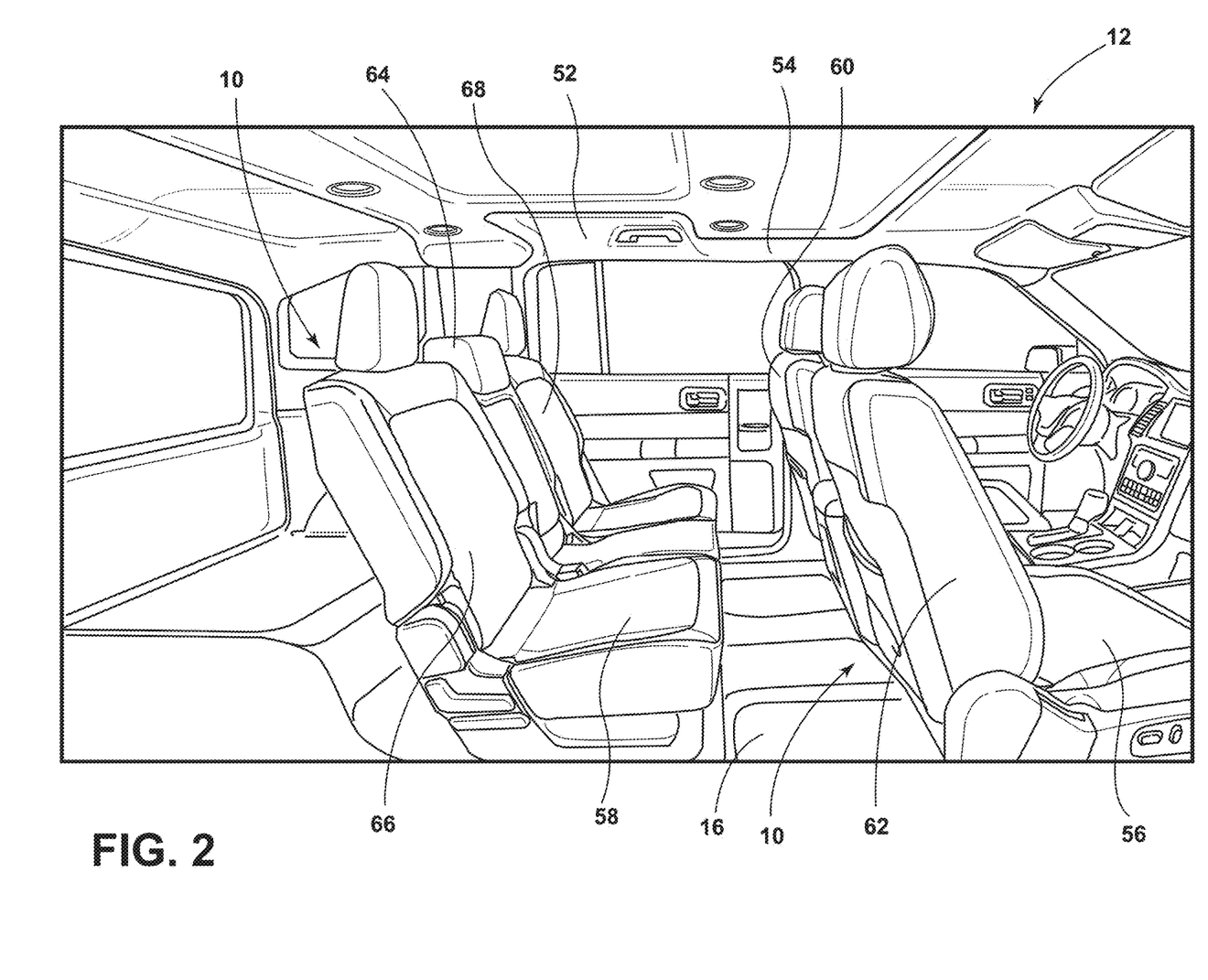
FIG. 2 is a partial enlarged top perspective view of a passenger compartment of a vehicle with seating assemblies of the present disclosure.

For purposes of description herein, the terms "upper," "lower," "right," "left," "rear," "front," "vertical," "horizontal," "interior," "exterior," and derivatives thereof shall relate to the disclosure as oriented in FIG. 1. However, it is to be understood that the disclosure may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-9, reference number 10 generally refers to a seating assembly 10 for a vehicle 12. The seating assembly 10 includes a track assembly 14 that is configured to be coupled to a floor 16 of the vehicle 12. A seat base 18 is operably coupled to the track assembly 14. The seat base 18 includes first and second crossbars 20, 22 and a towel bar 24 that is operably coupled to the first crossbar 20. A lock assembly 26 is operably coupled to the second crossbar 22 of the seat base 18 and is selectively coupled to the track assembly 14. The lock assembly 26 includes a lever 28 that is operably coupled to the first and second crossbars 20, 22 and is proximate to the track assembly 14. The lever 28 has a retention tab 30, and a biasing member 32 is operably coupled to the lever 28 proximate to the second crossbar 22.

Referring to FIGS. 1-4, the vehicle 12 includes a vehicle body 50, which defines an interior 52 of the vehicle 12 having a passenger compartment 54 therein. The passenger compartment 54 may include a first seating row 56 and a second seating row 58. Fewer or more seating rows may be included in vehicle 12 without departing from the teachings herein. The first seating row 56 may include a driver seat 60 and a passenger seat 62, and the second seating row 58 may include rear passenger seats 64. The rear passenger seats 64 of the second seating row 58 may include bucket seating or may be bench seating. As illustrated, the rear passenger seats 64 include a first rear passenger seat 66 and a second rear passenger seat 68.

In various examples, the vehicle 12 may be a motor vehicle, such as a land vehicle, an air vehicle, or a watercraft. The vehicle 12 may be driver-based, semi-autonomous, or fully-autonomous. For example, in semi-autonomous examples, the vehicle 12 may monitor and execute routine traffic maneuvers (e.g., braking, accelerating, lane changes, turning, parking, engaging turn signals, etc.) while a user maintains override control. In various examples, the vehicle 12 is a wheeled motor vehicle 12, which may be a sedan, a sport utility vehicle, a truck, a van, a crossover, and/or other styles of vehicle. Additionally, the vehicle 12 may be utilized for personal and/or commercial purposes, such as ride-providing services (e.g., chauffeuring) and/or ride-sharing services.

Figure 3:
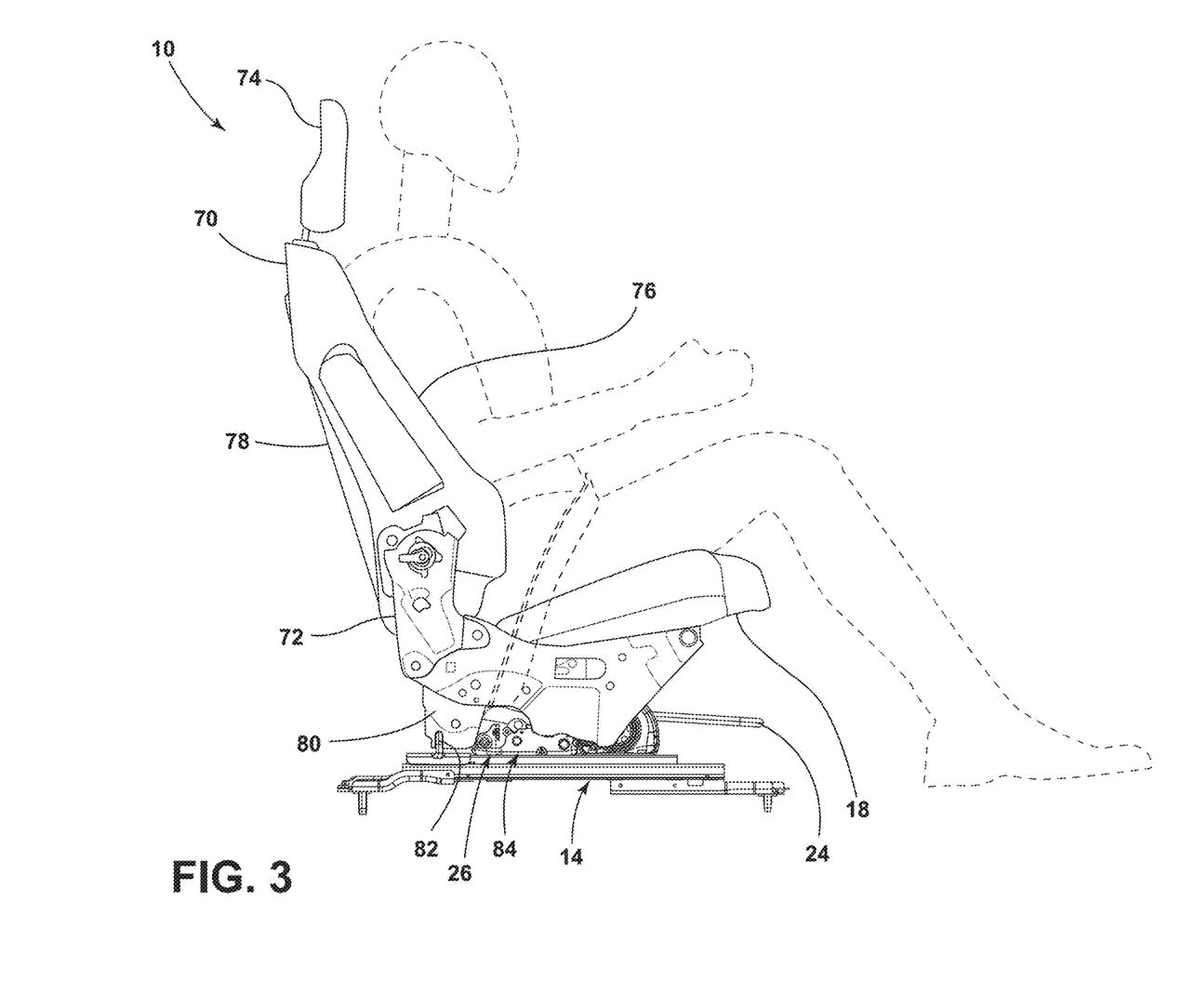
FIG. 3 is a side elevational view of a seating assembly of the present disclosure with an occupant in phantom.
Figure 4:
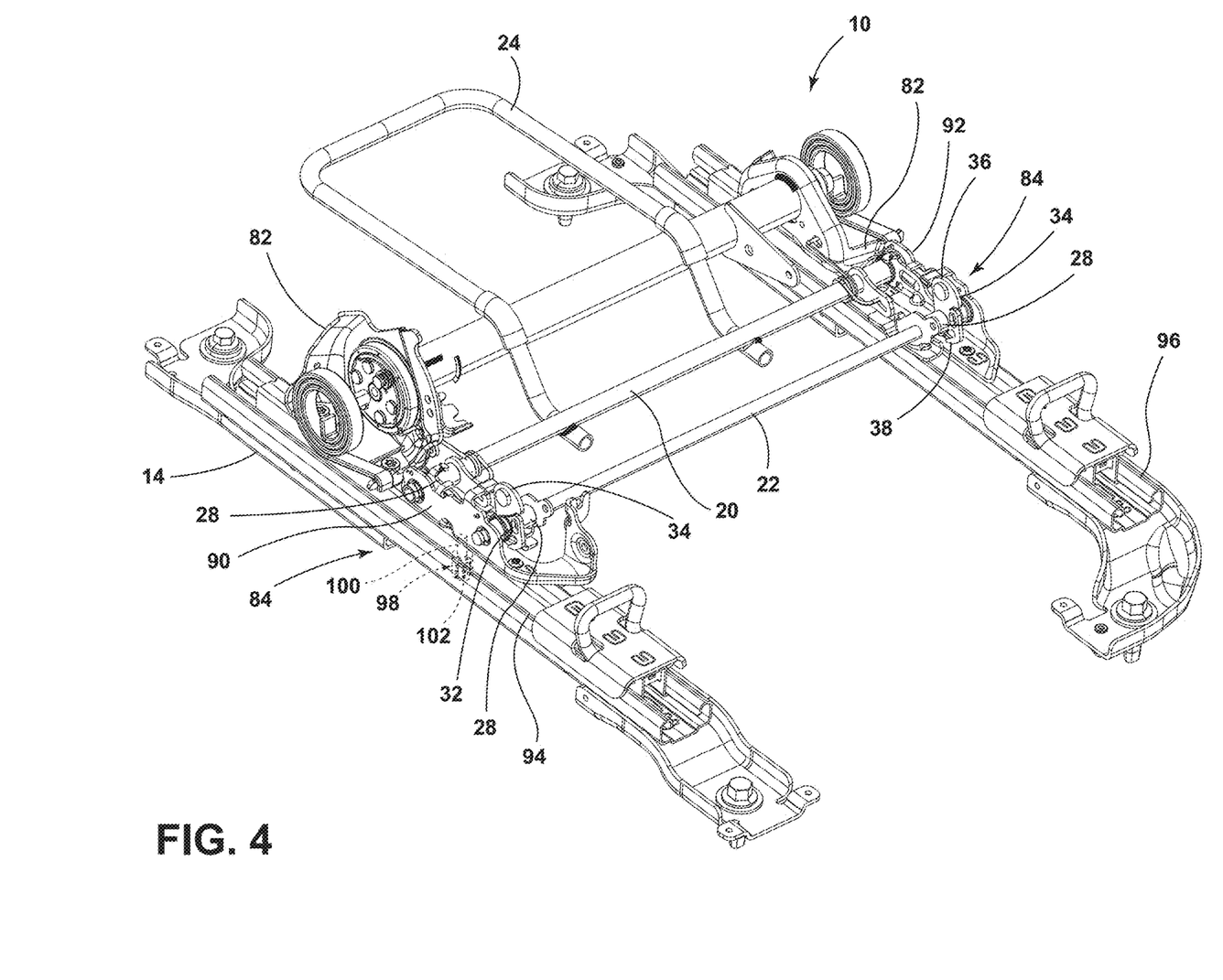
FIG. 4 is a top perspective view of a track assembly with a lock assembly of the present disclosure.
Figure 5:
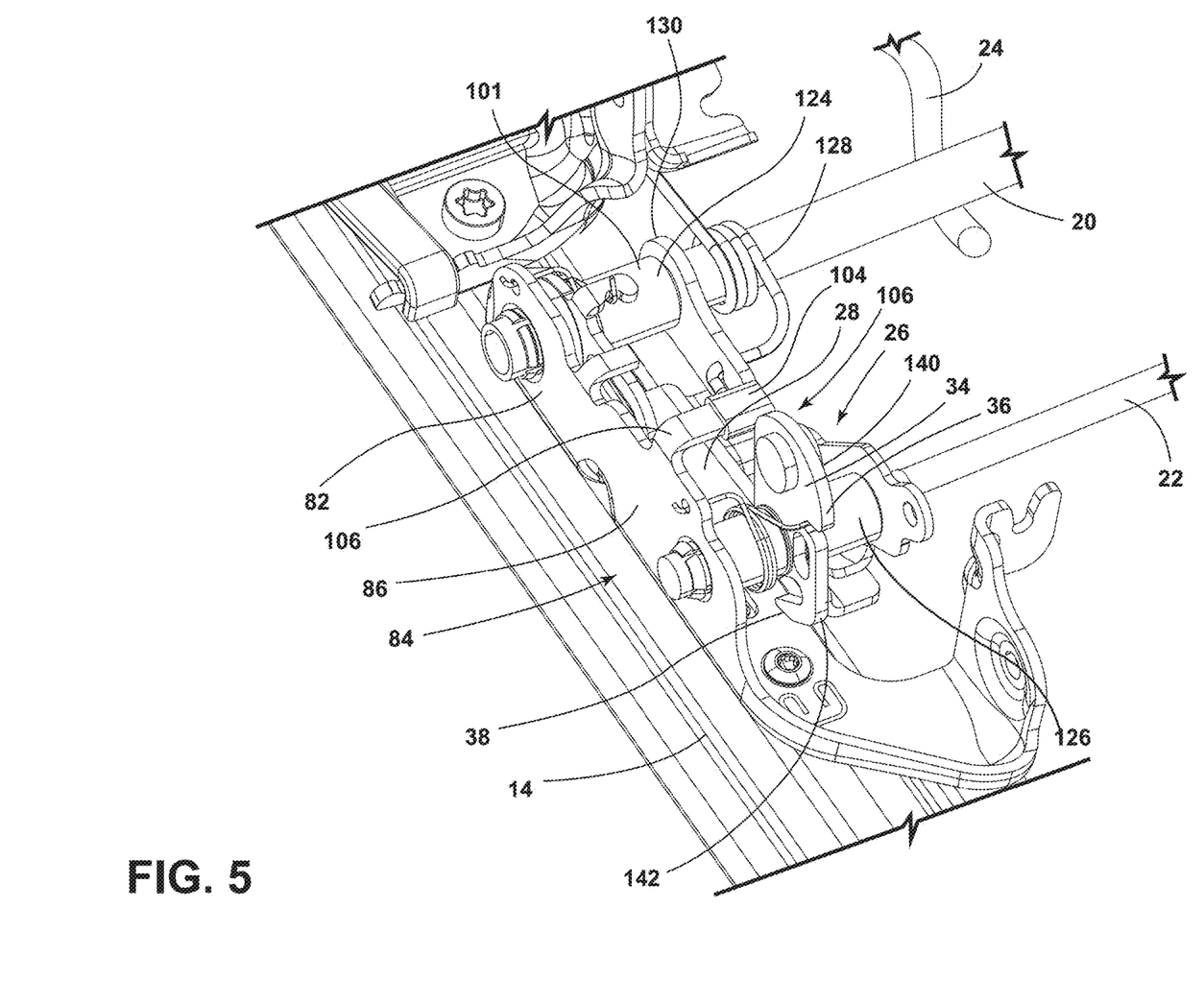
FIG. 5 is a partial enlarged view of a lock assembly of the present disclosure with a bracket, a lever, and an inertia member.
Figure 6:
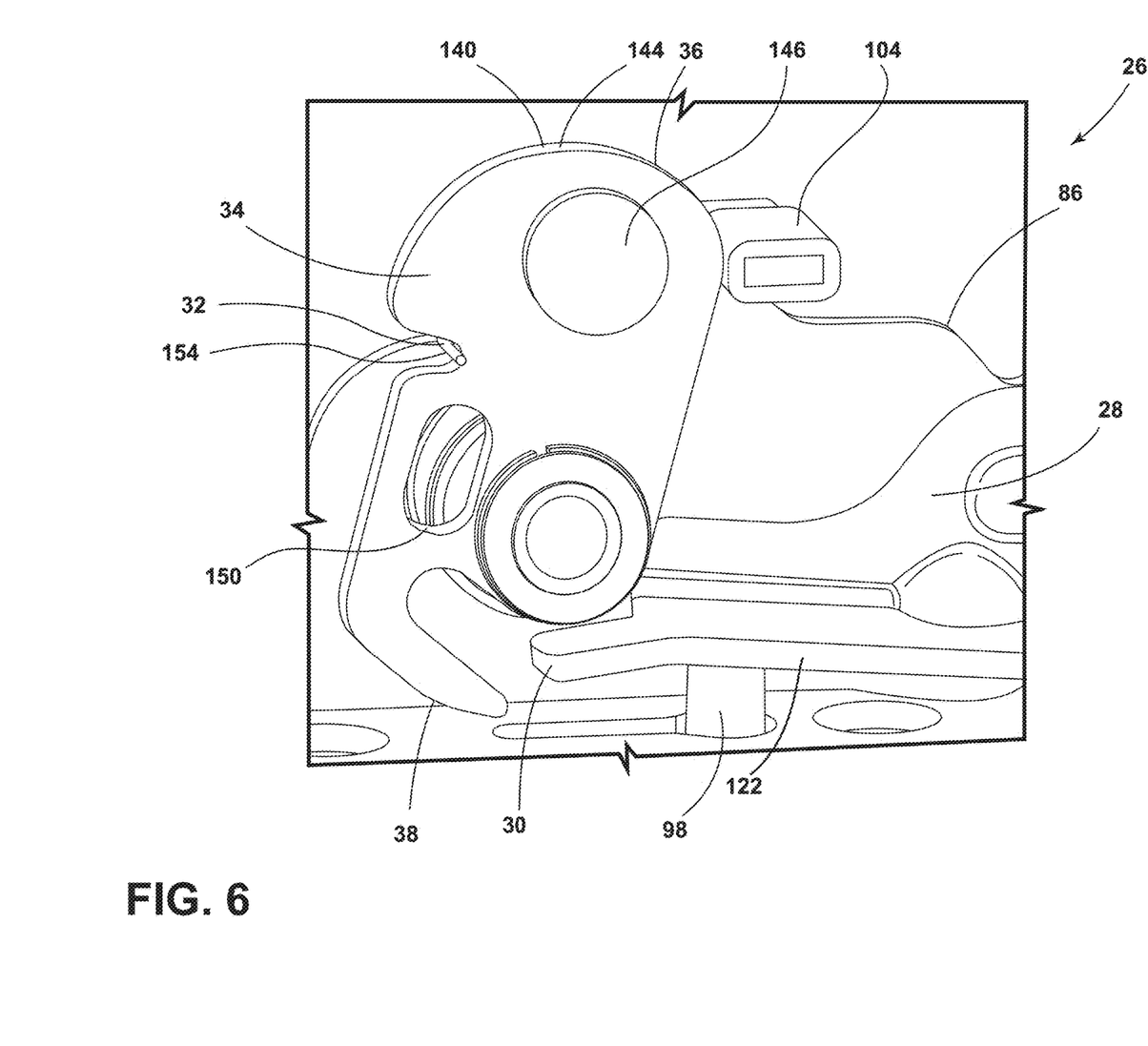
FIG. 6 is a partial enlarged view of the lever and inertia member of FIG. 5.
Figure 7:
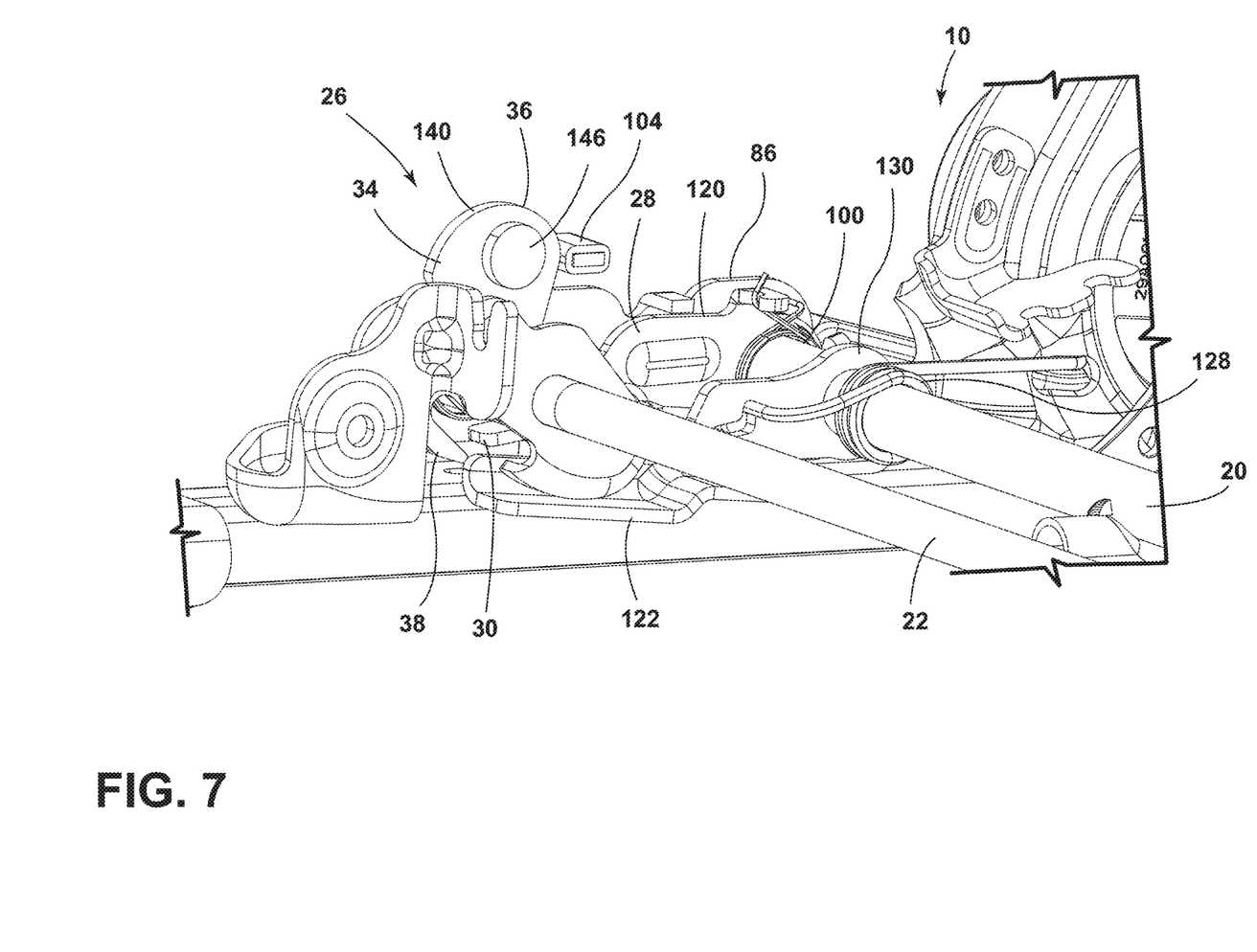
FIG. 7 is a partial enlarged view of first and second crossbars and a lock assembly of the present disclosure.
Figure 8:
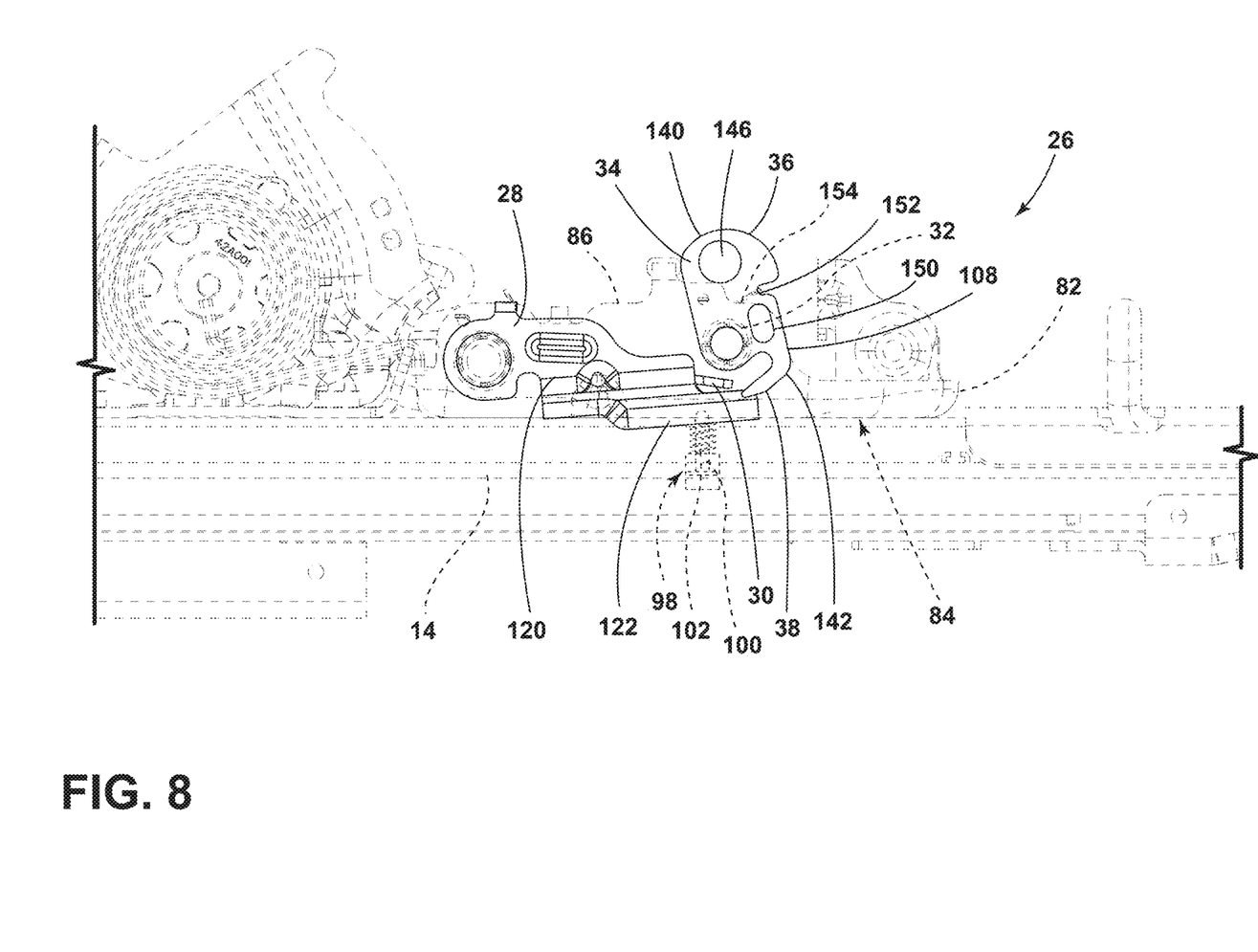
FIG. 8 is a partial enlarged side elevational view of a lock assembly of the present disclosure with a track assembly and seating assembly in phantom and with an inertia member in a first position.

Referring still to FIGS. 1-4, the seating assembly 10 includes a vehicle seat that includes a seat back 70 and the seat base 18, which are generally supported by and coupled to a seat frame 72. A headrest 74 may be coupled to the seat back 70, and the seat back 70 can define bolsters 76 that are integrally formed with the seat back 70. It is generally contemplated that the bolsters 76 can outwardly extend from a central portion 78 of the seat back 70. As illustrated in FIG. 3, the seat frame 72 of the seat base 18 includes supports 80 that are operably coupled to the track assembly 14 via adjustment tracks 82. It is generally contemplated that the seating assembly 10 includes an adjustment assembly 84 that is operably coupled to the seat base 18 and includes the adjustment tracks 82. The adjustment assembly 84 also includes the first and second crossbars 20, 22 and the towel bar 24, mentioned above, as well as a bracket 86 operably coupled to the adjustment tracks 82 proximate to the lever 28. The towel bar 24 is operably coupled to the first crossbar 20 to release the adjustment tracks 82, such that the seating assembly 10 can be translated along the track assembly 14. It is generally contemplated that the towel bar 24 is configured to translate between a raised position and a lowered position, such that the towel bar 24 engages the adjustment assembly 84 and the lock assembly 26 via the first and second crossbars 20, 22 in the raised position.

Referring now to FIGS. 3-6, the adjustment tracks 82 can slidably adjust the seating assembly 10 in a forward and rearward direction relative to the track assembly 14. The plurality of adjustment tracks 82 can include a first adjustment track 90 and a second adjustment track 92. It is generally contemplated that the first adjustment track 90 is operably coupled to a first rail 94 of the track assembly 14, and the second adjustment track 92 is operably coupled to the second rail 96 of the track assembly 14. The track assembly 14 includes the first and second rails 94, 96 and a plunger 98 that is operably coupled to each of both the first and second adjustment tracks 90, 92 and the first and second rails 94, 96. Stated differently, the first and second rails 94, 96 each include the plunger 98. As illustrated and described further below with respect to FIG. 8, the plunger 98 includes a rod 100 and a resilient member 102.

The plunger 98 is further operably coupled to the lever 28 and is configured to resist the movement of the seating assembly 10 along the track assembly 14. The plunger 98 is operable between an extended position and a depressed position, such that the plunger 98 resists movement of the seating assembly 10 when the plunger 98 is in the extended position. The plunger 98 can be depressed when the towel bar 24 engages the lever 28, as described below, such that the plunger 98 is translated into the depressed position. When the plunger 98 is in the depressed position it is generally contemplated that the seating assembly 10 can be translated forward and rearward along the first and second rails 94, 96 of the track assembly 14.

With further reference to FIGS. 3-6, the adjustment assembly 84 is configured to adjust or otherwise translate the seat base 18 along the track assembly 14 via the articulation of the towel bar 24, described in more detail below. The adjustment assembly 84 is operably coupled to the lock assembly 26 via the lever 28. For example, the first and second crossbars 20, 22 are disposed within tubes 101 to operably couple each of the first and second crossbars 20, 22 to the lever 28. The lever 28 is operably coupled to the bracket 86 of the adjustment tracks 82. It is generally contemplated that the lever 28 is configured to engage the plunger 98 of the track assembly 14 to activate and translate the seating assembly 10 along the track assembly 14, as described in more detail below.

The bracket 86 includes an engagement member 104 that is operably coupled to a flange 106 of the bracket 86. It is generally contemplated that the engagement number 104 may be a bumper configured to absorb the engagement with the inertia member 34, described further below. The engagement member 104 may be formed from rubber, silicone, and/or other practicable materials. Specifically, the weighted head 36 of the inertia member 34 is configured to be disposed against and engaged with the engagement member 104 in a first position 108 of the inertia member 34. The inertia member 34 is operable between the first position 108 and a second position 110 (FIG. 9), as described below. It is generally contemplated that the second position 110 (FIG. 9) of the inertia member 34 generally corresponds to the extended position of the plunger 98.

With reference now to FIGS. 4-7, the lever 28 is operably coupled to the bracket 86 via the tubes 101 through which the first and second crossbars 20, 22 extend. The lever 28 has a body 120 that includes a ledge 122 proximate to the retention tab 30. The tubes 101 of the lever 28 include a first tube 124 and a second tube 126, such that the first crossbar 20 is operably coupled to the first tube 124, and the second crossbar 22 is operably coupled to the second tube 126. The adjustment assembly 84 includes an adjustment biasing member 128 that is operably coupled to the first crossbar 20 and the first tube 124 to selectively alter the position of the lever 28. The adjustment biasing member 128 is coupled to a cam 130 that is fixedly coupled to the first crossbar 20. The rotation of the first crossbar 20 via the towel bar 24 biases the adjustment biasing member 128 to alter the position of the lever 28 via the cam 130.

With further reference to FIGS. 4-7, the inertia member 34 is operably coupled to the second tube 126 of the lever 28. The inertia member 34 includes a first end 140 and a second end 142, such that the weighted head 36 defines the first end 140 of the inertia member 34. As mentioned above, the inertia member 34 includes the weighted head 36 and the retention hook 38. The weighted head 36 is illustrated as having a generally rounded top portion 144 with a central protrusion 146. It is generally contemplated that the central protrusion 146 is configured to add weight or otherwise increase the mass of the weighted head 36 of the inertia member 34. It is generally contemplated that the central protrusion 146 may be a rivet fixedly coupled to the first end 140 of the inertia member 34 to define the weighted head 36. Additionally or alternatively, the central protrusion 146 can include any practicable feature configured to increase the overall weight of the weighted head 36 of the inertia member 34.

The second end 142 of the inertia member 34 is defined by the retention hook 38, which outwardly extends from a central body 148 of the inertia member 34. As illustrated, the central body 148 of the inertia member 34 is generally hollow or otherwise configured with at least one cutout 150 to minimize the overall weight of the central body 148 and the second end 142 of the inertia member 34. At least one of the cutouts 150 defined by the central body 148 of the inertia member 34 is configured to couple the inertia member 34 to the second tube 126 of the lever 28.

It is generally contemplated that the inertia member 34 is rotatably coupled to the second tube 126, such that the inertia member 34 may rotate about the second tube 126 between the first position 108 and the second position 110

Figure 9:
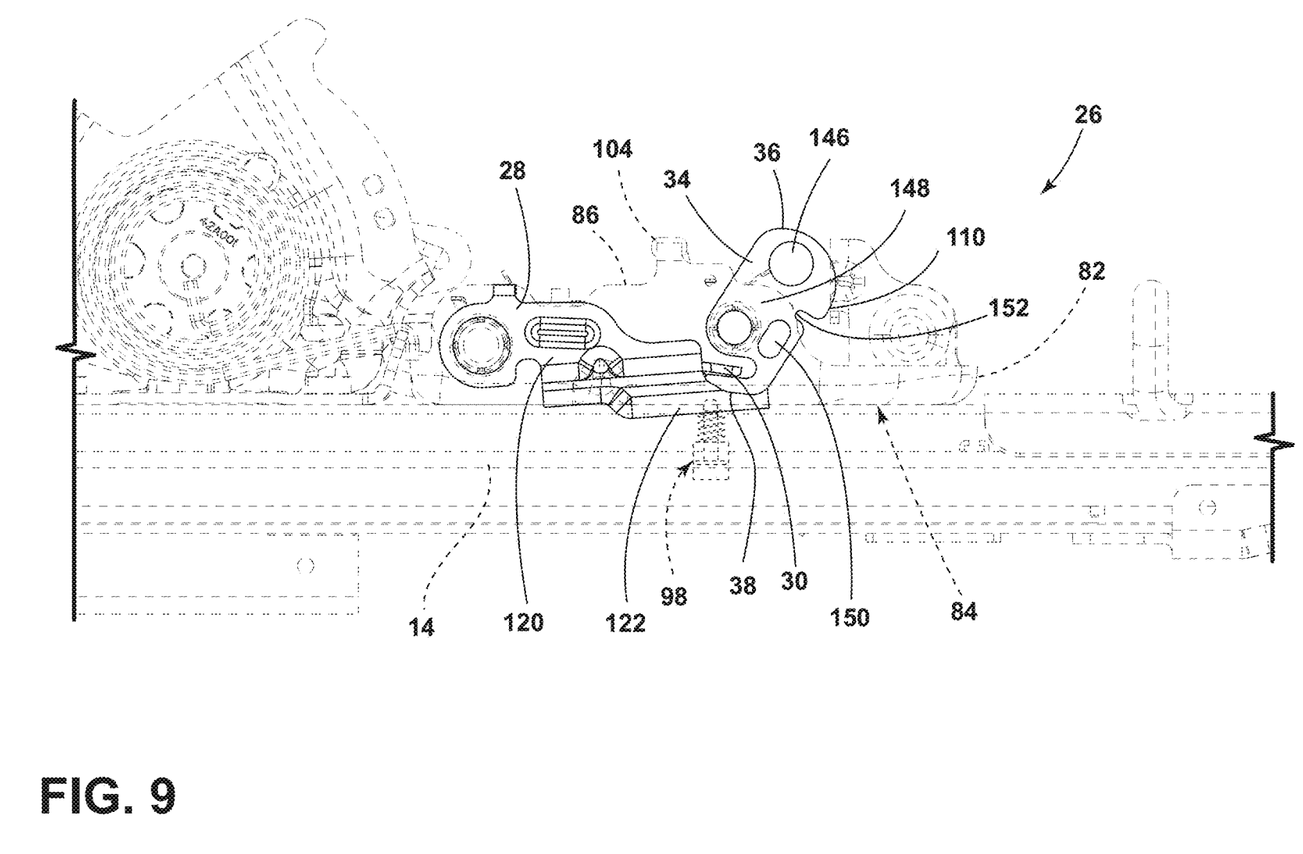
FIG. 9 is a partial enlarged side elevational view of the lock assembly of FIG. 8 with the inertia member in a second position.

(FIG. 9). As mentioned above, the retention hook 38 extends from the central body 148 of the inertia member 34 and is configured to selectively couple to the retention tab 30 defined by the lever 28. The retention hook 38 is illustrated as an extension from the second end 142 of the inertia member 34. It is generally contemplated that the retention hook 38 extends vehicle forward. Additionally or alternatively, the retention hook 38 may extend either the vehicle forward and/or the vehicle rearward depending on the configuration of the lock assembly 26 and the seating assembly 10. As described in more detail below, the inertia member 34 can rotate between the first and second positions 108, 110 and is operably coupled to the biasing member 32.

The biasing member 32 is coupled to the second tube 126. The central body 148 of the inertia member 34 defines a notch 152 in which a prong 154 of the biasing member 32 may be disposed. The biasing member 32 is generally configured to retain the inertia member 34 in the first position 108 during regular operation of the seating assembly 10 within the vehicle 12. The biasing member 32 generally defines a tensile force $F_1$ relative to the inertia member 34. The tensile force $F_1$ defined by the biasing member 32 generally retains the inertia member 34 in the first position 108 relative to the lever 28. It is further contemplated that the weighted head 36 includes a mass sufficient to overcome the tensile force $F_1$ defined by the biasing member 32 to translate the inertia member 34 from the first position 108 to the second position 110.

With reference now to FIGS. 1, 3, and 6-9, the vehicle 12 may encounter a force $F_2$ applied to a rear portion 170 of the vehicle 12. The force $F_2$ may generally correspond to a predetermined force $F_2$ relative to the inertia member 34 described below. It is contemplated that the inertia member 34 may rotate about the second tube 126 from the first position 108 to the second position 110 upon application of the predetermined force $F_2$ to the rear portion 170 of the vehicle 12. Stated differently, when the inertia member 34 encounters the predetermined force $F_2$, the weighted head 36 of the inertia member 34 may be sufficient to overcome the tensile force $F_1$ applied by the biasing member 32 to translate the inertia member 34 from the first position 108 to the second position 110.

The predetermined force $F_2$ is contemplated as the minimum force to be applied to the rear portion 170 of the vehicle 12 that may translate the inertia member 34 from the first position 108 to the second position 110. While the predetermined force $F_2$ is contemplated as a minimum force, it is also contemplated that a force greater than the predetermined force $F_2$ may be applied to the rear portion 170 of the vehicle 12. The inertia member 34 is configured to translate from the first position 108 to the second position 110 upon application of the predetermined force $F_2$ or any force greater than the predetermined force $F_2$.

With further reference to FIGS. 1, 3, and 6-9, the predetermined force $F_2$ ultimately acts on the weighted head 36 of the inertia member 34 to rotate the weighted head 36 away from the engagement member 104. The weighted head 36 has a weight that is greater than the tensile force $F_1$ of the biasing member 32. As the predetermined force $F_2$ acts on the weighted head 36, the weight of the weighted head 36 is sufficient to overcome the tensile force $F_1$ of the biasing member 32. Once the weighted head 36 overcomes the tensile force $F_1$, the weighted head 36 rotates the first end 140 away from the engagement member 104 and translates the second end 142 of the inertia member 34 toward the retention tab 30.

The second end 142 and the retention hook 38 rotate toward the retention tab 30, and the retention hook 38 is operably coupled to the retention tab 30. The retention hook 38 engages the retention tab 30 to maintain the position of the lever 28 relative to the track assembly 14. Stated differently, the retention hook 38 is operably coupled to the retention tab 30 of the lever 28 and is configured to maintain a separation between the plunger 98 and the lever 28. Under normal operation, the lever 28 can engage the plunger 98 when the towel bar 24 is articulated by an occupant. For example, the occupant may adjust the position of the seating assembly 10 by raising the towel bar 24 when the predetermined force $F_2$ is not applied on the inertia member 34. The adjustment of the towel bar 24 is configured to translate the seating assembly 10 freely when the inertia member 34 is in the first position 108.

Referring still to FIGS. 1, 3, and 6-9, the transition of the inertia member 34 into the second position 110 prevents the free transition of the seating assembly 10. The engagement of the retention hook 38 with the retention tab 30 resists potential movement of the lever 28 with respect to the plunger 98. For example, the predetermined force $F_2$ can act upon the rear portion 170 of the vehicle 12 and, ultimately, the inertia member 34 may result in the occupant inadvertently articulating the towel bar 24. The inertia member 34, however, is in the second position 110 when the predetermined force $F_2$ is applied, such that the retention hook 38 is coupled with the retention tab 30 of the lever 28. The engagement between the retention hook 38 and the retention tab 30 prevents the lever 28 from engaging the plunger 98, such that the plunger 98 remains in the extended position. Thus, the occupant is prevented from slidably translating the seating assembly 10 along the track assembly 14 as a result of the lock assembly 26. Upon removal of the predetermined force $F_2$, it is generally contemplated that the tensile force $F_1$ of the biasing member 32 can return the inertia member 34 to the first position 108, such that the weighted head 36 is engaged with the engagement member 104. As mentioned above, the engagement member 104 is configured to absorb contact with the weighted head 36, which generally extends the useful life of the inertia member 34.

Referring again to FIGS. 1-9, the lock assembly 26 minimizes incidental translation of the seating assembly 10 along the track assembly 14 upon the predetermined force $F_2$ acting upon the vehicle 12. The weighted head 36 assists in maintaining the inertia member 34 in the first position 108 during typical operation of the vehicle 12 and can overcome the tensile force $F_1$ of the biasing member 32 when the predetermined force $F_2$ is applied. Further, the cutouts 150 minimize the overall weight of the central body 148 to assist in maximizing the overall weight of the weighted head 36 relative to the rest of the inertia member 34. The rotation of the weighted head 36 assists in coupling the retention hook 38 to the retention tab 30, which overall prevents the slidable translation of the seating assembly 10 as the lever 28 is prevented from depressing the plunger 98. Thus, any incidental articulation of the towel bar 24 upon the application of the predetermined force $F_2$ is free from articulation of the seating assembly 10 as a whole.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A seating assembly for a vehicle, comprising:
   a track assembly configured to be coupled to a floor of said vehicle;
   a seat base operably coupled to the track assembly, the seat base including first and second crossbars and a towel bar operably coupled to the first crossbar; and
   a lock assembly operably coupled to the second crossbar of the seat base and selectively coupled to the track assembly, the lock assembly including:
      a lever operably coupled to the first and second crossbars and proximate to the track assembly, the lever having a retention tab;
      an inertia member operably coupled to the second crossbar, the inertia member having a weighted head and a retention hook; and
      a biasing member operably coupled to the inertia member proximate to the second crossbar;
      wherein the retention hook of the inertia member engages the retention tab of the lever when a predetermined inertial force rotates the inertia member about the second crossbar against a bias of the biasing member.

2. The seating assembly of claim 1, wherein the inertia member is selectively operable between a first position and a second position.

3. The seating assembly of claim 2, wherein the track assembly includes a plunger operable between a depressed position and an extended position, and wherein the seat base is configured to translate along the track assembly when the plunger is in the depressed position.

4. The seating assembly of claim 3, wherein the second position of the inertia member corresponds with the extended position of the plunger.

5. The seating assembly of claim 2, wherein the biasing member is configured to retain the inertia member in the first position until a predetermined force is applied.

6. The seating assembly of claim 2, wherein the retention hook of the inertia member is operably coupled to the retention tab of the lever in the second position of the inertia member.

7. The seating assembly of claim 1, wherein the weighted head of the inertia member is configured to rotate the inertia member upon application of a predetermined force.

8. A seating assembly, comprising:
   a track assembly including a first rail and a second rail;
   an adjustment assembly operably coupled to the track assembly, the adjustment assembly including first and second crossbars and a towel bar operably coupled to the first crossbar and configured to translate between a raised position and a lowered position;
   a lock assembly operably coupled to the adjustment assembly, the lock assembly including:
      a lever operably coupled to the first and second crossbars and configured rotate between a locking position and an unlocking position in response to translation of the towel bar, the lever having a body and a retention tab extending from the body; and
      an inertia member having a weighted head and a retention hook, the inertia member configured to rotate between a first position and a second position;
      wherein the retention hook of the lever inertia member engages the retention tab of the lever when a predetermined inertial force rotates the inertia member from the first position into the second position.

9. The seating assembly of claim 8, wherein the retention hook is selectively coupled to the retention tab of the lever in the second position of the inertia member.

10. The seating assembly of claim 8, wherein the inertia member is configured to rotate from the first position to the second position upon application of a predetermined force.

11. The seating assembly of claim 8, wherein each of the first and second rails of the track assembly include a plunger operably coupled to the lever and configured to translate between an extended position and a depressed position.

12. The seating assembly of claim 11, wherein the retention hook of the inertia member is operably coupled to the retention tab of the lever in the second position and is configured to maintain separation between the plunger and the lever.

13. The seating assembly of claim 8, further comprising:
   a biasing member operably coupled to the inertia member and configured to selectively maintain the inertia member in the first position.

* * * * *

UNITED STATES PATENT AND TRADEMARK OFFICE
CERTIFICATE OF CORRECTION

PATENT NO. : 11,642,988 B2
APPLICATION NO. : 17/335128
DATED : May 9, 2023
INVENTOR(S) : Thomas J. Susko It is certified that error appears in the above-identified patent and that said Letters Patent is hereby corrected as shown below:

In the Claims

Column 10:
Claim 8, Line 32;
After "configured" insert --to--

Signed and Sealed this
Seventh Day of November, 2023

*Katherine Kelly Vidal*
Katherine Kelly Vidal
*Director of the United States Patent and Trademark Office*